United States Patent [19]

Okumura et al.

[11] Patent Number: 5,138,455
[45] Date of Patent: Aug. 11, 1992

[54] VIDEO SIGNAL PROCESSING CIRCUIT FOR COMPRESSED PICTURE INSERTION FUNCTION OF TELEVISION RECEIVER

[75] Inventors: Naoji Okumura, Osaka; Hirohiko Sakashita, Nara, both of Japan

[73] Assignee: Matsushita Electric Industrial Co., Ltd., Osaka, Japan

[21] Appl. No.: 705,040

[22] Filed: May 28, 1991

[30] Foreign Application Priority Data

May 28, 1990 [JP] Japan ................... 2-137804

[51] Int. Cl.⁵ .................... H04N 5/262; H04N 5/272
[52] U.S. Cl. ................................... 358/183; 358/181; 358/22
[58] Field of Search ................... 358/183, 22 PIP, 181

[56] References Cited

U.S. PATENT DOCUMENTS

| 4,665,438 | 5/1987 | Miron | 358/183 |
| 4,746,983 | 5/1988 | Hakamada | 358/22 PIP |
| 4,750,039 | 6/1988 | Willis | 358/183 |

FOREIGN PATENT DOCUMENTS 1-32980  5/1990  Japan.

Primary Examiner—Tommy P. Chin
Attorney, Agent, or Firm—Lowe, Price, LeBlanc & Becker

[57] ABSTRACT

A video signal processing circuit for providing a compressed picture insertion function in a television receiver, whereby a compressed-size picture expressed by one video signal is displayed as an insert within a full-size picture that is expressed by another video signal, by demodulating and combining the video signals, which can be of respectively different television standards, such as the PAL and MUSE standards. The circuit utilizes only one demodulator circuit for one video signal and two demodulator circuits for the other signal. When one of the video signals is in accordance with a broadcast standard such as the MUSE standard, which requires a large-scale demodulator circuit, a significant reduction in overall circuit scale is achieved by comparison with the prior art, in which two demodulator circuits are required for each of the video signals.

4 Claims, 5 Drawing Sheets

VIDEO SIGNAL PROCESSING CIRCUIT FOR COMPRESSED PICTURE INSERTION FUNCTION OF TELEVISION RECEIVER

BACKGROUND OF THE INVENTION

1. Field of the Invention

The present invention relates to a video signal processing circuit for a television receiver, for effecting time axis compression of a first video signal and for inserting the resultant compressed signal into a second video signal, for providing a dual-picture display having a compressed-size picture within a full-size picture.

In particular, the invention relates to a video signal processing circuit whereby such a signal compression and insertion function can be applied to two video signals that are in accordance with respectively different television broadcasting standards.

2. Description of the Related Art

In recent years, accompanying advances in digital technology for video signals, various types of digital television receivers have been developed, and various features have been proposed for these. Among these features is a signal processing circuit which effects time axis compression of a first video signal and inserts the resultant compressed video signal into a second video signal. As a result, a display picture is obtained in which a picture represented by the first video signal appears in compressed size within a full-size picture that is represented by the second video signal. Such a feature has until now been mainly utilized to enable a viewer to simultaneously monitor two different television broadcast channels. However the feature has been extended to allow a picture expressed by a video signal in accordance with one television broadcasting standard (e.g. the PAL standard) to be inserted in compressed size within a picture that is expressed by a video signal in accordance with a different standard (e.g. the NTSC standard, the MUSE standard, A prior art example of such a video signal processing circuit will be described in the following, referring to the block diagram of FIG. 1, and also to FIG. 2 which shows an example of a display picture that is produced by the operation of such a processing circuit, and FIG. 3 which shows waveforms illustrating the operation. In FIG. 1, numeral 21 denotes a first analog-to-digital (hereinafter, A/D) converter for converting a first analog video signal that is applied to an input terminal IN1, to a digital signal. Numeral 22 denotes a second A/D converter, for effecting conversion to a digital signal of a second analog video signal that is inputted to a second input terminal IN2. Numerals 23 to 26 denote first to fourth demodulator circuits respectively, for demodulating the digital signals that have thus been converted. Numeral 27 denotes a compression circuit for effecting time axis compression of a video signal. Numeral 28 denotes a switching circuit for inserting the compressed second input signal into the first input signal. Numeral 29 denotes a digital-to-analog (hereinafter, D/A) converter for converting the processed digital signal back to analog video signal form. In FIG. 2, numeral 30 denotes the picture that is expressed by the first video signal, and 31 denotes the picture that is expressed by the (time axis compressed) second video signal, which as shown is inserted into the picture 30.

The operation of the above signal processing circuit will be described in the following, referring to FIG. 3. The input video signal that is supplied to the first input terminal IN1 is converted to a digital signal S by the A/D converter 21. The converted digital signal S is inputted to each of two demodulator circuits 23 and 24, to be demodulated and outputted. The demodulator circuits 23 and demodulator circuit 24 are designed for operating on video signals of respectively different television broadcasting standards, for example the PAL standard and the SECAM standard, the PAL standard and the MAC standard, the NTSC standard and the MUSE standard, etc. It will be assumed that output signals will not be simultaneously produced from both the demodulator circuit 23 and the demodulator circuit 24. More specifically, it will be assumed that when a video signal that is in accordance with the television standard of the first demodulator circuit 23 is being applied to the input terminal IN1, there will be no output signal produced from the first demodulator circuit 23, and conversely that when a television signal in accordance with the standard of the second demodulator circuit 24 is being applied, there will be no output signal produced from the first demodulator circuit 23. The video signal that is supplied to the second input terminal IN2 is converted from an analog signal to a digital signal T, by the A/D converter 22. It is then supplied to two demodulator circuits 25 and 26, to be demodulated by the appropriate one of these. The relationships between the demodulator circuit 25 and the demodulator circuit 26 are identical to the relationships between the demodulator circuit 23 and the demodulator circuit 24 described above.

The output signal from the demodulator circuit 25 or the demodulator circuit 26 is subjected to time axis compression by the compression circuit 27, whose operation is based on a memory. Circuits for executing such time axis compression are now very well known in the art, so that detailed description will be omitted here, and also in the description given hereinafter of embodiments of the present invention. At the same time, the compression circuit 27 outputs a switching signal X for use in controlling the insertion of the second video signal V into the first video signal U by a switching circuit 28. That insertion operation can be understood from the waveform diagrams of FIG. 3, in which (b) and (c) show examples of waveforms of the first and second video signals respectively during each of successive horizontal scanning intervals, corresponding to successive horizontal scan lines of the displayed picture. The compressed second video signal is illustrated as waveform (d), which is inserted into the output signal from the switching circuit 28, under the control of the switching signal from the compression circuit 27 (waveform (e)). That is, in response to that switching signal, designated as X, the switching circuit 28 inserts the output signal W from the compression circuit 27, as an insertion signal Y, into the output signal U from the demodulator circuit 23 or from the demodulator circuit 24, and outputs the resultant signal. The output signal from the switching circuit 28, consisting of the first video signal with the compressed second video signal inserted therein, is then converted to an analog signal by the D/A converter 29.

FIG. 2 shows an example of the display that is produced when the second video signal represents the character B while the first video signal represents the character A.

Assuming for example that the demodulator circuits 23 and the 25 are each designed as PAL standard demodulator circuits, and that the demodulator circuits 24 and 26 are each designed as MAC standard demodulator circuits, then when a MAC standard video signal (e.g. supplied to input terminal IN1) is to be compressed and inserted into a PAL standard video signal (e.g. supplied to input terminal IN2), the PAL standard first demodulator circuit 23 and the MAC standard fourth demodulator circuit 26 are used. Conversely, when a MAC standard video signal is to have a PAL standard second video signal compressed and inserted therein, then the MAC standard second demodulator circuit 24 and the PAL standard third demodulator circuit 25 are used.

However with such a prior art signal processing circuit, it is necessary to use a plurality of demodulator circuits, even when these are extremely large-scale circuits such as are required with the MAC standard, or with the MUSE standard. Hence, the overall circuit scale will be large, and the manufacturing cost will be high.

It is an objective of the present invention to overcome the above problems by providing a signal processing circuit whereby it becomes unnecessary to provide a plurality of large-scale demodulator circuits, such as are required for the MAC television standard or MUSE standard.

SUMMARY OF THE INVENTION

It is an objective of the present invention to overcome the disadvantages of such a prior art video signal processing circuit, by providing a video signal processing circuit for a television receiver whereby it becomes possible to effect insertion of a compressed-size picture into a full-size picture, wherein the compressed-size picture and the full-size picture can be expressed by television signals of two respectively different standards, and wherein it becomes unnecessary, for a specific one of the two standards, to provide a plurality of video signal demodulator circuits in accordance with that standard.

To achieve the above objective, according to a first aspect, a video signal processing circuit according to the present invention comprises:

a first analog-to-digital converter coupled to receive an analog first video signal to a digital video signal;

first and second demodulator circuits having respective output terminals connected in common and each coupled to receive said digital video signal from said first analog-to-digital converter;

a second analog-to-digital converter coupled to receive an analog second video signal, for converting said second analog video signal to a digital video signal;

a third demodulator circuit for demodulating said digital video signal produced from said second analog-to-digital converter;

a first switching circuit for selecting one of said output signal produced from said common output terminal of said first and second demodulator circuit and an output signal produced from said third demodulator circuit, to be outputted therefrom;

a second switching circuit for selecting one of said output signal produced from said common output terminal of said first and second demodulator circuit or said output signal produced from said third demodulator circuit;

a compression circuit for effecting time axis compression of an output signal produced from said second switching circuit, to produce a compressed output signal, and for producing a switching signal;

a third switching circuit for inserting an output signal produced from said compression circuit into said output signal from said first switching circuit, in accordance with said switching signal which is produced from said compression circuit; and a digital-to-analog converter for converting an output signal produced from said third switching circuit from a digital video signal to an analog video signal.

According to a second aspect, the present invention provides a video signal processing circuit comprising:

a first analog-to-digital converter for converting a first analog video signal to a digital signal;

a first demodulator circuit for demodulating said digital signal from said first analog-to-digital converter;

a second analog-to-digital converter for converting a second analog video signal to a digital signal;

a first switching circuit for selecting either an output signal from said first analog-to-digital converter or an output signal from said second analog-to-digital converter;

a second demodulator circuit for demodulating an output signal produced from said first switching circuit;

a third demodulator circuit for demodulating said output signal from said second analog-to-digital converter;

a second switching circuit coupled to receive an output signal produced from said second demodulator circuit, and having first and second output terminals, for selectively transferring said output signal to said first and second output terminals;

a compression circuit having an input terminal coupled to said second output terminal of said second switching circuit and to an output terminal of said third demodulator circuit, for effecting time axis compression of an output signal produced from one of said second output terminal and said third demodulator circuit output terminal, and for producing a switching signal;

a third switching circuit having an input terminal coupled to said second output terminal of said second switching circuit and to an output terminal of said first demodulator circuit, for inserting an output signal produced from said compression circuit into said an output signal produced from one of said second output terminal of said second switching circuit and said output terminal of said first demodulator circuit, in accordance with said switching signal; and a digital-to-analog converter for converting said output signal from said third switching circuit from a digital video signal to an analog video signal.

With a video signal processing circuit according to the first aspect of the present invention, the circuit includes a first A/D converter for converting a first video signal, and first and second demodulator circuits, one of which (depending upon the particular television standard of the first video signal) is used to obtain a first demodulated video signal from the output signal of the first A/D converter. A second A/D converter receives a second video signal, and a third demodulator circuit derives a second demodulated video signal from the output signal of the second A/D converter. Thus the third demodulator circuit must of course be in accordance with the television standard of the second video signal. One of these first and second demodulated video signals is selected by a first switching circuit, to obtain a video signal which will represent a full-size picture, while the other one of these first and second demodulated video signals is selected by a second switching circuit, to be subjected to time axis compression and inserted into the demodulated video signal that expresses the full-size picture. The time-axis compressed output signal from the second switching circuit is inserted into the output signal from the first switching circuit by a third switching circuit, and the resultant digital video signal is then transferred through a D/A converter, as in the prior art signal processing circuit, to obtain an output signal which can be displayed.

Thus in this case, assuming that the first and third demodulator circuits are both PAL standard demodulator circuits, while the second demodulator circuit is a MAC standard demodulator circuit, then to insert a compressed-size MAC standard picture into a PAL standard picture, then that can be done by applying the PAL standard video signal to the second input terminal and the MAC standard video signal to the first input terminal, and controlling the first switching circuit to select the output signal from the third demodulator circuit (i.e. the PAL standard video signal) while the second switching circuit is controlled to select the output signal from the second demodulator circuit (i.e. the MAC standard video signal). Conversely, to effect time axis compression of the PAL standard picture and insert that into the MAC standard picture, the PAL standard video signal is supplied to the second input terminal and the MAC standard video signal to the first input terminal, and the first switching circuit selects the output signal from the second demodulator circuit (i.e. the MAC standard video signal) while the second switching circuit selects the output signal from the third demodulator circuit (i.e. the PAL standard video signal).

According to the invention as recited in claim 2, first and second video signals are demodulated by first and second A/D converters and by first and third demodulator circuits. In addition, one of the output signals from the first and second A/D converters is selected by a first switching circuit, and is then demodulated by the second demodulator circuit, while the output signal from the first demodulator circuit or from the third demodulator circuit is connected to the output from the second demodulator circuit by the second switching circuit. The output signal from second switching circuit or the the third demodulator circuit is subjected to time axis compression by a compression circuit, and the resultant time-axis compressed signal is inserted into the output signal from the first demodulator circuit or the output signal from the second switching circuit Thus in this case, for example, if the first and third demodulator circuits are each PAL standard demodulator circuits, and the second demodulator circuit is a MAC standard demodulator circuit, then if a compressed-size MAC standard picture is to be inserted into a PAL standard picture, the PAL standard video signal is applied to the first input terminal and the MAC standard video signal is applied to the second input terminal, the first switching circuit selects the video signal that is outputted from the second A/D converter, (i.e. the MAC standard video signal) and the second switching circuit selects the output signal from the third demodulator circuit. Conversely, if a compress-size PAL standard picture is to be inserted into a MAC standard picture, then the PAL standard video signal is applied to the second input terminal and the MAC standard video signal is applied to the first input terminal, the first switching circuit selects the video signal that is outputted from the first A/D converter, (i.e. the MAC standard video signal) and the second switching circuit selects the output signal from the first demodulator circuit.

DESCRIPTION OF PREFERRED EMBODIMENTS

Figure 1:
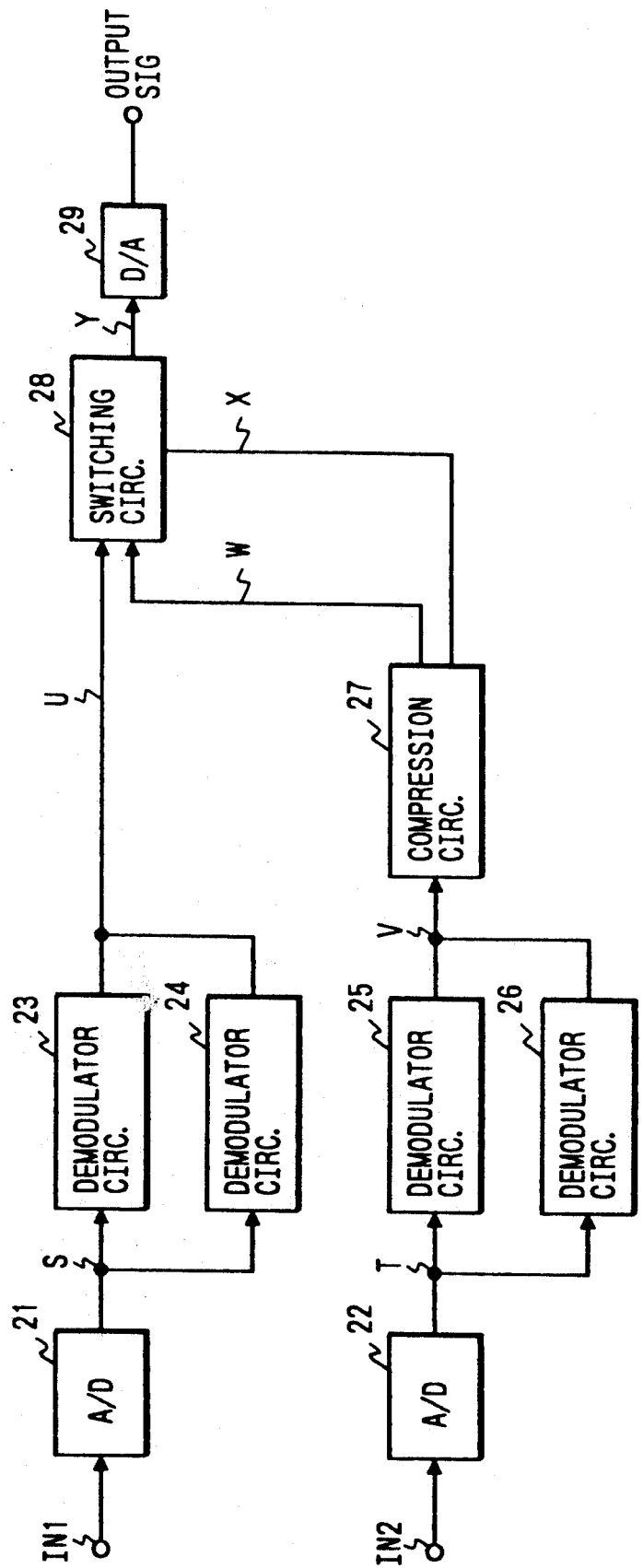
FIG. 1 is a block diagram of an example of a prior art video signal processing circuit.
Figure 2:
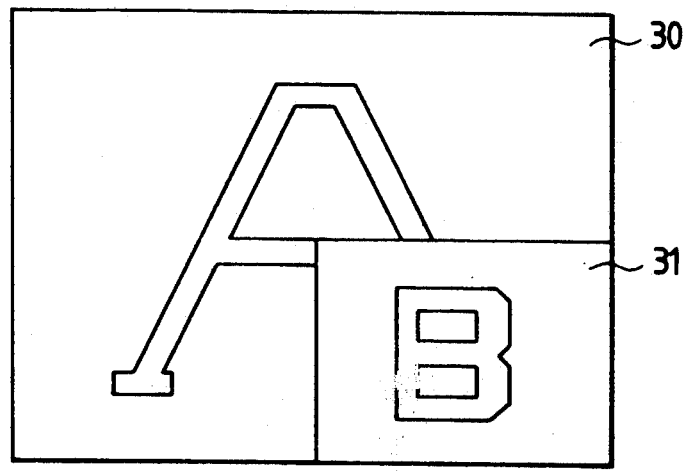
FIG. 2 shows an example of a display picture.

Embodiments of an signal processing circuit according to the present invention will be described in the following referring to the drawings.

Figure 4:
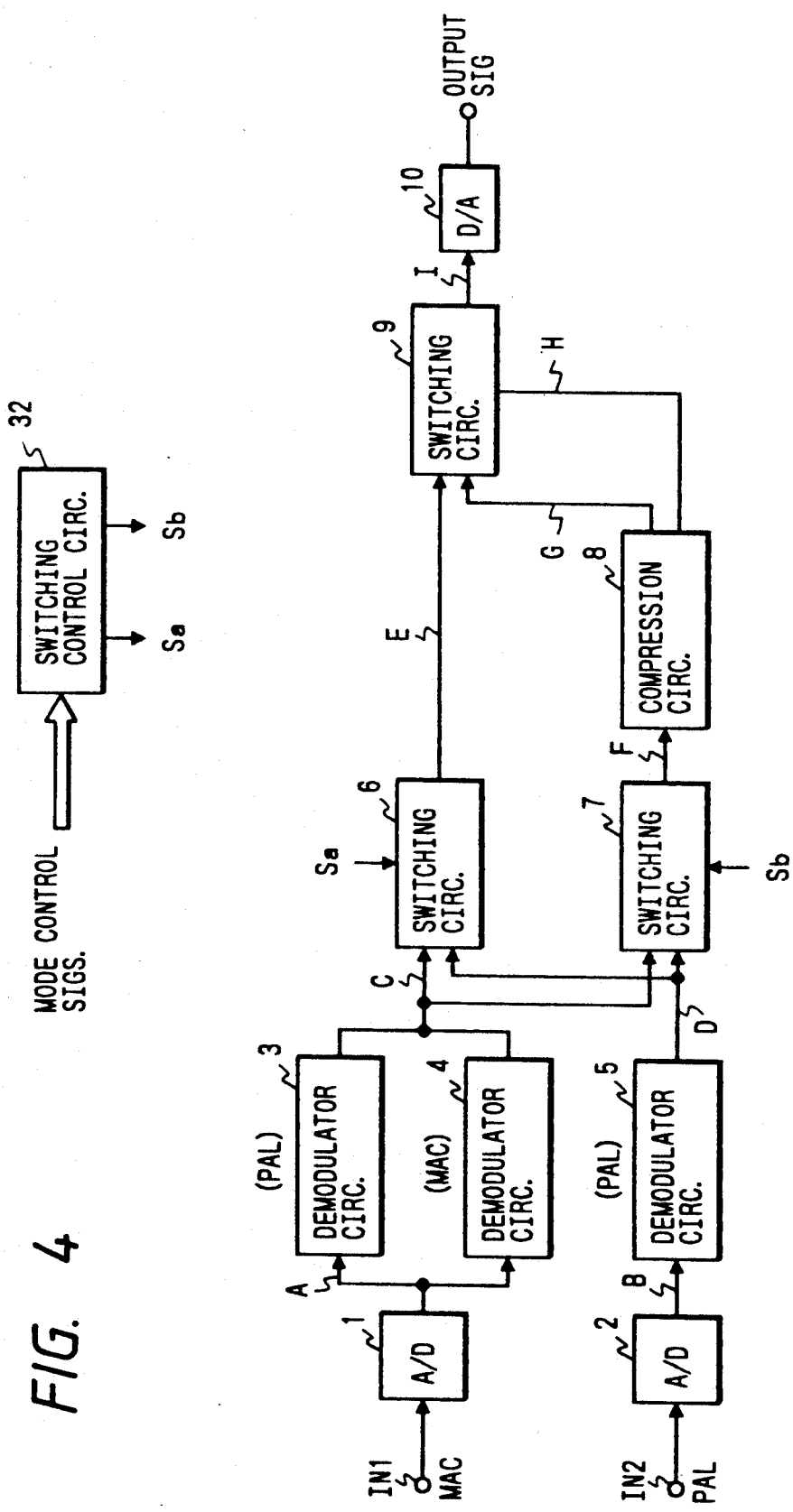
FIG. 4 is a block diagram of a first embodiment of a video signal processing circuit according to the present invention.

FIG. 4 is a block diagram of a first embodiment of a signal processing circuit according to the present invention. In FIG. 4, numeral 1 denotes a first A/D converter for converting an analog first video signal that is applied to a first input terminal IN1 to a digital signal. Numeral 2 denotes a second A/D converter for converting an analog second video signal that is applied to a second input terminal IN2 to a digital signal. Numerals 3 and 4 denote first and second demodulator circuits respectively, designed for respectively different television broadcasting standards, which effect demodulation of the output signal of the first A/D converter 1, and which have respective output terminals that are connected in common. Numeral 5 denotes a third demodulator circuit, for demodulating the output signal from the second A/D converter. Numeral 6 denotes a first switching circuit, for selecting either an output signal (designated as C) produced from the aforementioned common output terminal of the pair of demodulator circuits 3 and 4 or an output signal produced from the third demodulator circuit 5 (designated as D), to obtain a video signal (designated as F) representing a full-size picture. Numeral 7 denotes a second switching circuit which selects either the output signal C produced from the pair of demodulator circuits 3 and 4 or the output signal D from the third demodulator circuit 5, to obtain a video signal (designated as F) that will be subjected to time axis compression. Numeral 8 denotes a compression circuit which applies time axis compression to the output signal F from the second switching circuit 7. Numeral 9 denotes a third switching circuit, for inserting the compressed output signal (designated as G) from the compression circuit 8 into the output signal E produced from the first switching circuit 6, under the control of a switching signal G that is produced from the compression circuit 8. Numeral 10 denotes a D/A converter for converting the digital output signal (designated as I) from the third switching circuit 9 to an analog signal, which is supplied to an output terminal. Numeral 32 denotes a switching control circuit, which produces switching control signals $S_a$ and $S_b$ for controlling the switching circuits 6 and 7 respectively, in accordance with mode control signals that are supplied from external circuits. The mode control signals are generated in accordance with a mode of compressed-picture insertion that is specified by the user, for example in accordance with a requirement for that mode to be implemented by compressing the video signal that is currently being applied to input terminal IN2 and inserting the resultant compressed signal into the video signal that is currently being applied to input terminal IN1.

Figure 3:
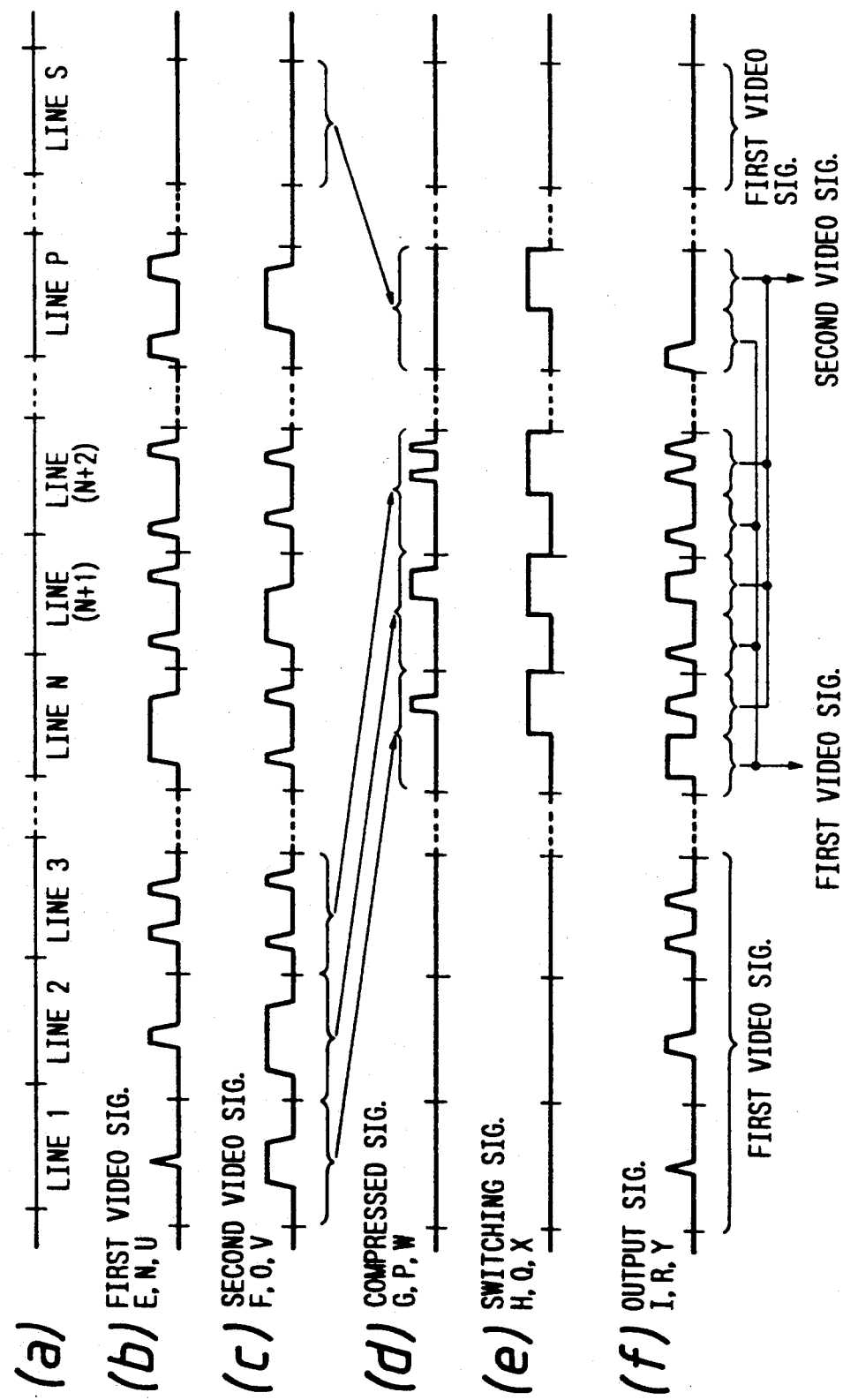
FIG. 3 is a waveform diagram for describing the operation of the example of FIG. 1.

The operation of the signal processing circuit having the above configuration will be described referring to FIGS. 4 and 3. However it should be noted that in this case the designations "first video signal" and "second video signal" in FIG. 3 respectively signify "output signal from the switching circuit 6" and "output signal from switching circuit 7" (represented in analog form). Firstly, the video signal that is inputted from the first input terminal IN1 is converted from an analog signal to a digital signal A by the first A/D converter 1. Next, the converted digital signal A is inputted to the first demodulator circuit 3 and the second demodulator circuit 4, to obtain the demodulated signal C.

The first demodulator circuit 3 and the second demodulator circuit 4 are demodulator circuits for two respectively different television broadcasting standards, for example the PAL standard and the SECAM standard, the PAL standard and the MAC standard, the NTSC standard and the MUSE standard, etc. It will be assumed that it is not possible for output signals to be produced simultaneously from the first demodulator circuit 3 and the second demodulator circuit 4, i.e. that an output signal will be produced from a demodulator circuit only when a video signal that is in accordance with the television standard of that demodulator circuit is supplied to it. The video signal that is inputted from the second input terminal IN2 is converted from an analog signal to a digital signal B by the second A/D converter 2. That signal B is then demodulated by the third demodulator circuit 5. The first switching circuit 6 is controlled to select either the output signal C from the first demodulator circuit 3 or second demodulator circuit 4, or the output signal D from the third demodulator circuit 5, to be used as the signal E representing a full-size picture. The waveform of that signal E can for example be as shown at (b) in FIG. 3.

In addition, the second switching circuit 7 is controlled to select either the output signal C that is produced from the first demodulator circuit 3 or the second demodulator circuit 4, or the output signal D from the third demodulator circuit 5, to be subjected to time axis compression and inserted as a signal representing a compressed-size picture. The output signal F from the second switching circuit 7 (e.g. having the waveform shown at (c) in FIG. 3) is then time axis compressed by the compression circuit, which utilizes a memory for effecting that compression, and the resultant output signal G is obtained, which (as shown at (d) in FIG. 3) is produced at the appropriate timings for insertion into specific scan lines of each frame of the video signal E that is outputted from the first switching circuit 6. At the same time, the compression circuit produces a switching signal H (shown as waveform (e) in FIG. 3) for controlling the insertion of that output signal G into the signal E. Based on that switching signal H, the third switching circuit 9 inserts the output signal G from the compression circuit into the output signal E from the first switching circuit 6, to obtain a resultant signal I (shown at (f) in FIG. 3). The D/A converter 10 converts that output signal I from a digital signal to an analog signal, which is supplied to the output terminal.

If it is assumed for example that the first demodulator circuit 3 and the third demodulator circuit 5 are each PAL standard demodulator circuits, and that the second demodulator circuit 4 is a MAC standard demodulator circuit, then when a compressed-size MAC standard picture is to be inserted into a PAL standard picture, that is achieved by applying the PAL standard video signal to the second input terminal IN2, applying the MAC standard video signal to the first input terminal IN1, controlling the first switching circuit 6 to select the output signal from the third demodulator circuit 5 (i.e. the PAL standard video signal), and controlling the second switching circuit 7 to select the output signal from the second demodulator circuit 4 (i.e. the MAC standard video signal).

Conversely, when a PAL standard compressed-size picture is to be inserted into a MAC standard picture, this is achieved by applying the PAL standard video signal to the second input terminal IN2, applying the MAC standard video signal to the first input terminal IN1, controlling the first switching circuit 6 to select the output signal from the second demodulator circuit 4 (i.e. the MAC standard video signal), and controlling the second switching circuit 7 to select the output signal from the third demodulator circuit 5 (i.e. the PAL standard video signal).

Figure 5:
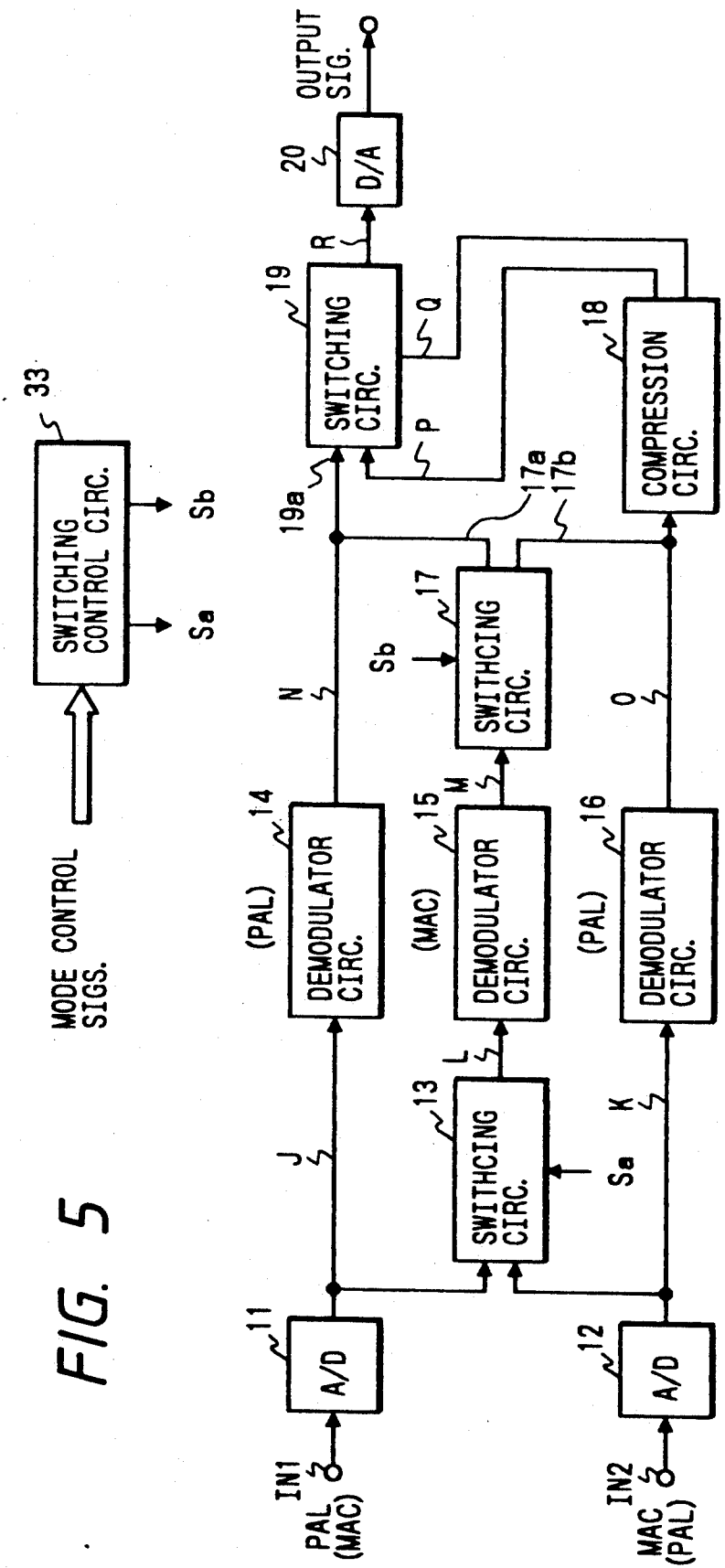
FIG. 5 is a block diagram of a second embodiment of a video signal processing circuit according to the present invention.

FIG. 5 is a block diagram of a second embodiment of a signal processing circuit according to the present invention. In FIG. 5, numeral 11 denotes a first A/D converter, for converting an analog first video signal that is applied to a first input terminal IN1 to a digital signal. Numeral 2 denotes a second A/D converter for converting an analog second video signal that is applied to a second input terminal IN2 to a digital signal. Numeral 14 denotes a demodulator circuit for demodulating the output signal of the first A/D converter 11, 16 denotes a third demodulator circuit, for demodulating the output signal from the second A/D converter 12. Numeral 13 denotes a first switching circuit, for selecting the output signal from the first A/D converter 11 or the output signal from the second A/D converter 12. Numeral 15 denotes a second demodulator circuit, for demodulating the output video signal from the first switching circuit 13. Numeral 17 denotes a second switching circuit which has a first output terminal 17a and second output terminal 17b, and which is controlled to transfer the output signal from the demodulator circuit 15 either to terminal 17a or terminal 17b. Numeral 18 denotes a compression circuit having an input terminal 18a, which applies time axis compression to an input signal supplied to that input terminal 18a. The input terminal 18a is connected to both the output terminal 17b of the switching circuit 17 and also to the output terminal of the third demodulator circuit 16. Numeral 19 denotes a third switching circuit, having an input terminal 19a, for inserting the compressed output signal produced from the compression circuit 18 into an input signal that is applied to the input terminal 19a. The insertion operation is executed under the control of a switching signal Q that is produced from the compression circuit 18. Numeral 20 denotes a D/A converter for converting the digital output signal from the third switching circuit 19 to an analog video signal, which is supplied to an output terminal. Numeral 33 denotes a switching control circuit, which produces switching control signals $S_a$ and $S_b$ for controlling the switching circuits 13 and 17 respectively, in accordance with mode control signals that are supplied from external circuits as for the first embodiment described above.

The operation of the signal processing circuit having the above configuration will be described referring to FIGS. 5 and 3.

Firstly, the video signal that is inputted from the first input terminal IN1 is converted from an analog signal to a digital signal J by the first A/D converter 11. The converted digital signal J is inputted to the first demodulator circuit 14, to obtain a demodulated signal N. The video signal that is applied to the second input terminal IN2 is converted to a digital signal K by the second A/D converter 12, which is then demodulated by the third demodulator circuit 16. In addition, the first switching circuit 13 selects either the output signal from the first A/D converter 11 or from the second A/D converter 12 to be outputted as a signal L. The second demodulator circuit 15 then demodulates that output signal L to obtain a signal M.

The first demodulator circuit 14 and the third demodulator circuit 16 are demodulator circuits for the same television broadcasting standard, which is different from a standard of the second demodulator circuit 15. For example the first demodulator circuit 14 and second demodulator circuit 15 may be for the PAL standard and the second demodulator circuit 15 for the SECAM standard, or these can be respectively for the PAL standard and the MAC standard, or the NTSC standard and the MUSE standard, etc. It will be assumed that it is not possible for output signals to be produced simultaneously from the first demodulator circuit 14 and from the output terminal 17a of the second switching circuit 17, and also that output signals cannot be simultaneously produced from the third demodulator circuit 16 and from the output terminal 17b of switching circuit 17. The output signal O from the third demodulator circuit 16, which is connected to ouput terminal 17b of the second switching circuit 17, is subjected to time axis compression by the compression circuit 18, to obtain a signal P.

At the same time, the compression circuit 18 outputs a switching signal Q for the purposes of signal insertion. Assuming that the circuit is operating in a condition in which the output signal N is being produced from the demodulator circuit 14 (with, as described above, no output signal being produced from terminal 17a of the switching circuit 17), the third switching circuit 19 inserts the output signal P from the compression circuit 18 into the output signal N, in accordance with the switching signal Q. The output signal R that is thereby produced from the third switching circuit 19 is then converted from a digital to an analog signal by the D/A converter 20.

If it assumed for example that the first demodulator circuit 14 and the third demodulator circuit 16 are each designed as PAL standard demodulator circuits, and that the second demodulator circuit 15 is a MAC standard demodulator circuit, then in order to insert a compress-size MAC standard picture into a PAL standard picture, the following operations are executed. The PAL standard video signal is applied to the first input terminal IN1, the MAC standard video is applied to signal to the second input terminal IN2, the first switching circuit 13 is controlled to select the output signal from the second A/D converter 12 (i.e. the MAC standard video signal), and the second switching circuit 17 is controlled to connect the output signal M from the demodulator circuit 15 to the output terminal 17b. In that condition, the digital MAC video signal M will be compressed by the compression circuit 18 and inserted into the digital PAL video signal N, by the third switching circuit 19.

Conversely, when a PAL standard compressed-size picture is to be inserted into a MAC standard picture, this is done by applying the PAL standard video signal to the second input terminal IN2, applying the MAC standard video signal to the first input terminal IN1, controlling the first switching circuit 13 to select the output signal from the second A/D converter 12 (i.e. the MAC standard video signal), controlling the second switching circuit 17 to connect the resultant (MAC) demodulated signal M to the output terminal 17b. In that condition, the digital PAL video signal M will be compressed by the compression circuit 18 and inserted into the digital MAC video signal N, by the third switching circuit 19.

In general, a video signal processing circuit according to the invention can be advantageously applied to a television receiver which is capable of receiving both conventional television signals and high-definition television signals, such as those of the "High-Vision" standard. In that case, in the first embodiment of FIG. 4, the first and third demoulator circuits (3 and 5) would be designed to demodulate a conventional television signal, and the second demodulator circuit would be designed to demodulate a high-definition television signal. In the case of the second embodiment of FIG. 5, the first and third demodulator circuits (14 and 16) would be designed for demodulating a conventional television signal, while the second demodulator circuit (15) would be designed for demodulating a high-definition television signal.

It can be understood from the above that with both of the embodiments of a signal processing circuit according to the present invention it becomes possible, for example, to insert a compressed-size MAC standard picture into a PAL standard picture, or to insert a compressed-size PAL standard picture into a MAC standard picture, without the need to use a plurality of MAC standard demodulator circuits, which are very large in circuit scale.

What is claimed is:

1. A video signal processing circuit comprising:
   a first analog-to-digital converter coupled to convert a first analog video signal to a digital video signal;
   first and second demodulator circuits having respective output terminals connected in common and each coupled to receive said digital video signal from said first analog-to-digital converter;
   a second analog-to-digital converter coupled to receive a second analog video signal, for converting said second analog video signal to a digital video signal;
   a third demodulator circuit for demodulating said digital video signal produced from said second analog-to-digital converter;
   a first switching circuit for selecting one of said output signal produced from said common output terminal of said first and second demodulator circuits and an output signal produced from said third demodulator circuit, to be outputted therefrom;
   a second switching circuit for selecting one of said output signal produced from said common output terminal of said first and second demodulator circuits and said output signal produced from said third demodulator circuit;

a compression circuit for effecting time axis compression of an output signal produced from said second switching circuit, to produce a compressed output signal, and for producing a switching signal;

a third switching circuit for inserting an said compressed output signal produced from said compression circuit into said output signal from said first switching circuit, in accordance with said switching signal which is produced from said compression circuit;

a switching control circuit for controlling respective operations of said first and second switching circuits in accordance with a required mode of compressed-picture insertion; and a digital-to-analog converter for converting an output signal produced from said third switching circuit from a digital video signal to an analog video signal.

2. A video signal processing circuit according to claim 1, wherein said first demodulator circuit is adapted for demodulating a high-definition television signal, and each of said second and third demodulator circuits is adapted for demodulating a conventional television signal.

3. A signal processing circuit comprising:
- a first analog-to-digital converter for converting a first analog video signal to a digital signal;
- a first demodulator circuit for demodulating said digital signal from said first analog-to-digital converter;
- a second analog-to-digital converter for converting a second analog video signal to a digital signal;
- a first switching circuit for selecting one of an output signal from said first analog-to-digital converter and an output signal from said second analog-to-digital converter;
- a second demodulator circuit for demodulating an output signal produced from said first switching circuit;
- a third demodulator circuit for demodulating said output signal from said second analog-to-digital converter;
- a second switching circuit coupled to receive an output signal produced from said second demodulator circuit, and having first and second output terminals, for selectively transferring said output signal produced from said second demodulator circuit to said first and second output terminals;
- a compression circuit having an input terminal coupled to said second output terminal of said second switching circuit and to an output terminal of said third demodulator circuit, for effecting time axis compression of an output signal produced from one of said second output terminal and said third demodulator circuit output terminal, and for producing a switching signal;
- a switching control circuit for controlling respective operations of said first and second switching circuits in accordance with a required mode of compressed-picture insertion;
- a third switching circuit having an input terminal coupled to said first output terminal of said second switching circuit and to an output terminal of said first demodulator circuit, for inserting an output signal produced from said compression circuit into said output signal produced from one of said second output terminal of said second switching circuit and said output terminal of said first demodulator circuit, in accordance with said switching signal; and
- a digital-to-analog converter for converting said output signal from said third switching circuit from a digital video signal to an analog video signal.

4. A video signal processing circuit according to claim 3, wherein each of said first and third demodulator circuits is adapted for demodulating a conventional television signal, and said second demodulator circuit is adapted for demodulating a high-definition television signal.

* * * * *